US006691643B1

(12) United States Patent
Hollins

(10) Patent No.: US 6,691,643 B1
(45) Date of Patent: Feb. 17, 2004

(54) ANIMAL EXTRACTION GATE

(75) Inventor: Larry Thomas Hollins, 108 Miles St., Cooter, MO (US) 63839

(73) Assignee: Larry Thomas Hollins, Cooter, MO (US)

( * ) Notice: Subject to any disclaimer, the term of this patent is extended or adjusted under 35 U.S.C. 154(b) by 0 days.

(21) Appl. No.: 10/334,526

(22) Filed: Dec. 31, 2002

(51) Int. Cl.[7] .............................. A01K 1/03; E06B 7/28; E06B 3/00

(52) U.S. Cl. .............................. 119/484; 52/208; 52/198

(58) Field of Search .............................. 119/484, 485; 52/208, 204.5, 198, 302.3; 454/254

(56) References Cited

U.S. PATENT DOCUMENTS 3,499,246 A * 3/1970 Loukas .............................. 119/484
3,874,118 A * 4/1975 Robinson .............................. 119/484
3,967,424 A * 7/1976 Gates .............................. 52/208
4,043,079 A * 8/1977 Smith .............................. 119/484
4,291,645 A * 9/1981 Cruchelow et al. .............................. 119/484
5,293,920 A * 3/1994 Vagedes .............................. 52/198
5,890,455 A * 4/1999 Donchey .............................. 119/484
6,581,668 B1 * 6/2003 Oakley .............................. 52/208
6,604,994 B2 * 8/2003 Achen .............................. 52/198

* cited by examiner

*Primary Examiner*—Charles T. Jordan
*Assistant Examiner*—Elizabeth Shaw

(57) ABSTRACT

An animal extraction gate which can be fitted in any of multiple vent openings in a foundation wall or siding of an elevated structure to enable exit of an animal or animals from beneath the structure through the animal extraction gate while preventing re-entry of the animal or animals through the gate and beneath the structure. The animal extraction gate includes a gate frame for attachment to the vent and having a gate door pivotally mounted on the gate frame. The gate door is movable between a closed position wherein the gate door closes the frame opening and an open position wherein the gate door opens the frame opening. A bias mechanism biases the gate door in the closed position. In use, multiple foundation vents provided in a foundation siding or wall extending around the perimeter of the structure are closed or sealed and the animal extraction gate is installed in at least one of the foundation vents, such that the animal is capable of leaving the crawl space beneath the structure only by exiting the animal extraction gate and is incapable of re-entering the crawl space through the closed or sealed foundation vents or the animal extraction gate.

20 Claims, 5 Drawing Sheets

ANIMAL EXTRACTION GATE

BACKGROUND OF THE INVENTION

1. Field of the Invention

The present invention relates generally to devices for removing or extracting animals from a defined area and preventing re-entry of the animals into the area. More particularly, the present invention relates to an animal extraction gate which can be removably attached to a standard vent opening in a foundation siding or wall on an elevated structure to enable exit of animals from the crawl space beneath the structure while preventing re-entry of the animals into the crawl space.

2. Description of the Prior Art

The structures of many houses and businesses in the United States, particularly older structures or structures located near a large lake, an ocean or the Gulf of Mexico, are built in an elevated position with respect to the ground. These structures typically are supported by brick or concrete footings that are spaced along the perimeter of the structure and support the structure above the ground. In many cases, foundation siding spans the footings to close off the crawl space between the ground and the floor of the structure for aesthetic purposes. Alternatively, the structure may be supported on the ground by a continuous brick or concrete foundation wall having a height of typically about 1–2 feet. Foundation vents are provided at spaced intervals in the foundation siding or wall to vent the air in the crawl space beneath the structure.

The intrusion of animals such as skunks, raccoons, armadillos, cats, rodents and other small animals through the ground-level foundation vents into the crawl space beneath elevated structures has long been a problem frequently associated with the elevated structures. Such unwanted intrustion of these animals into the crawl space may result in the generation of offensive odors, particularly in the case of skunks, as well as noise, destruction of property, and unsanitary and unhealthy conditions beneath and around the structure. Moreover, the crawl space may serve as a habitation for the animals, which give birth to additional animals beneath the house and thereby multiply the problems associated with the presence of the animals.

Another concern related to the presence of wild animals in immediate proximity to residences and other structures inhabited by humans is the tendency of such animals to carry infectious diseases. These include rabies as well as hantavirus, which has been known to cause hemorrhagic fever with renal syndrome and hantavirus pulmonary syndrome (HPS). The hantavirus strains that cause both diseases are carried by rodents and are believed to be transmitted to humans through respiration of airborne fecal particles from the infected rodents. Hantaviruses are particularly aggressive; severe respiratory distress may occur within as little as 12 hours of infection, and death may occur in as little as 24 to 36 hours. The animals also serve as a major source of allergins for humans.

In the past, solutions to the problem of removing animals from the crawl space beneath an elevated structure have included trapping or poisoning the animal or animals within the crawl space. Besides being less than completely effective, these methods frequently entail the disagreeable task of locating and disposing of the animal, as well as the potential of encountering a frightened or injured and potentially harmful animal upon entering the crawl space to retrieve the animal. Furthermore, poisoning the animal may cause the animal to die within inaccessible spaces in the floor or walls of the structure. One technique which has been used to prevent the entry of animals into a defined area includes the installation of electric wires or other devices in the area. In the event that the animal contacts the wire or device in an effort to enter the area, the animal is shocked and conditioned to leave the area and stay away. However, the use of such electrical wires or devices may be relatively expensive, dangerous, elaborate and unsightly.

Accordingly, an apparatus is needed for the safe, effective, effortless and humane removal of animals from beneath an elevated structure such as a home or business, while preventing re-entry of the animals beneath the structure.

SUMMARY OF THE INVENTION

The present invention is directed to an animal extraction gate which has a simple construction and may be easily installed in a standard foundation vent of an elevated structure for the effective and humane removal of animals from beneath the structure.

An object of the present invention is to provide animal extraction gate that is characterized by ease of installation and which effectively facilitates the removal of skunks, raccoons, armadillos, and other small animals from beneath an elevated structure.

Another object of the present invention is to provide an animal extraction gate which faciltates the removal of animals from beneath an elevated structure such as a house or business without the need for killing, injuring or trapping the animals.

Still another object of the present invention is to provide an animal extraction gate which enables exit of animals from a crawl space beneath an elevated structure and prevents re-entry of the animals back into the crawl space.

Yet another object of the present invention is to provide an aesthetically-pleasing animal extraction gate which may be readily installed on a standard foundation vent in a foundation siding or wall of an elevated structure.

A still further object of the present invention is to provide an animal extraction gate which facilitates the removal of animals from beneath an elevated structure without requiring contact of a person with the animals.

Another object of the present invention is to provide a humane and effective method of removing animals from beneath an elevated structure.

Yet another object of the present invention is to provide an animal extraction gate which may be spring-loaded to enable exit of an animal from a crawl space beneath a house through the gate while preventing re-entry of the animal back into the crawl space through the gate.

A still further object of the present invention is to provide a method of removing animals from a crawl space beneath an elevated structure, which method may include closing or sealing multiple foundation vents provided in a foundation siding or wall extending around the perimeter of the structure and installing an animal extraction gate in at least one of the foundation vents, such that the animal is capable of leaving the crawl space only by exiting the animal extraction gate or gates and is incapable of re-entering the crawl space through the closed or sealed foundation vents or the animal extraction gate or gates.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

DETAILED DESCRIPTION OF THE PREFERRED EMBODIMENTS

Shown throughout the drawings, the present invention is generally directed towards an animal extraction gate that is aesthetically-pleasing and simple in construction and can be fitted in any of multiple vent openings in a foundation siding of an elevated structure to enable exit of an animal or animals from beneath the structure through the animal extraction gate while preventing both re-entry of the animal or animals and entry of an additional animal or animals through the gate and beneath the structure.

Figure 1:
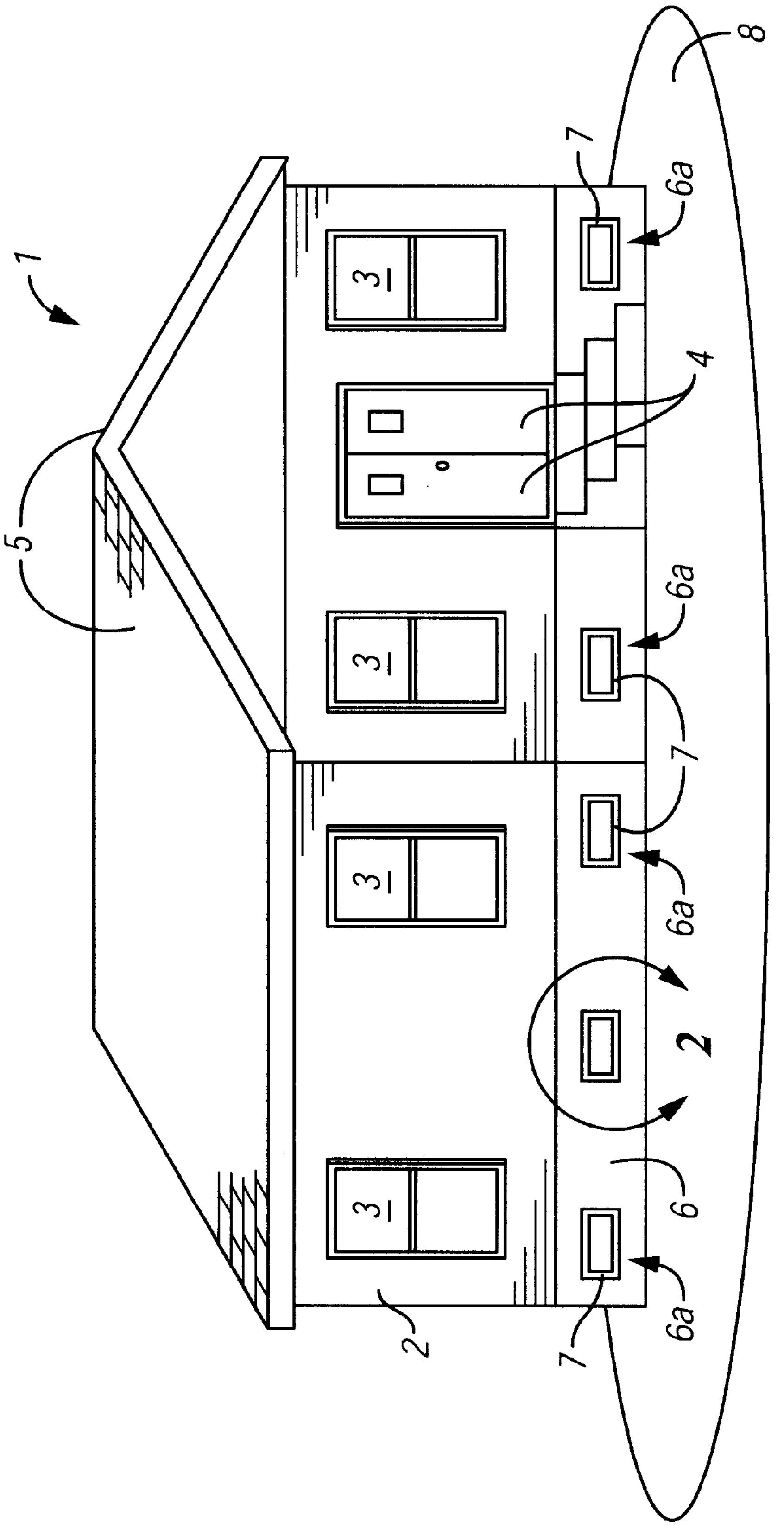
FIG. 1 is a front perspective view of an elevated structure, having a foundation siding and multiple foundation vents provided in the foundation siding.
Figure 2:
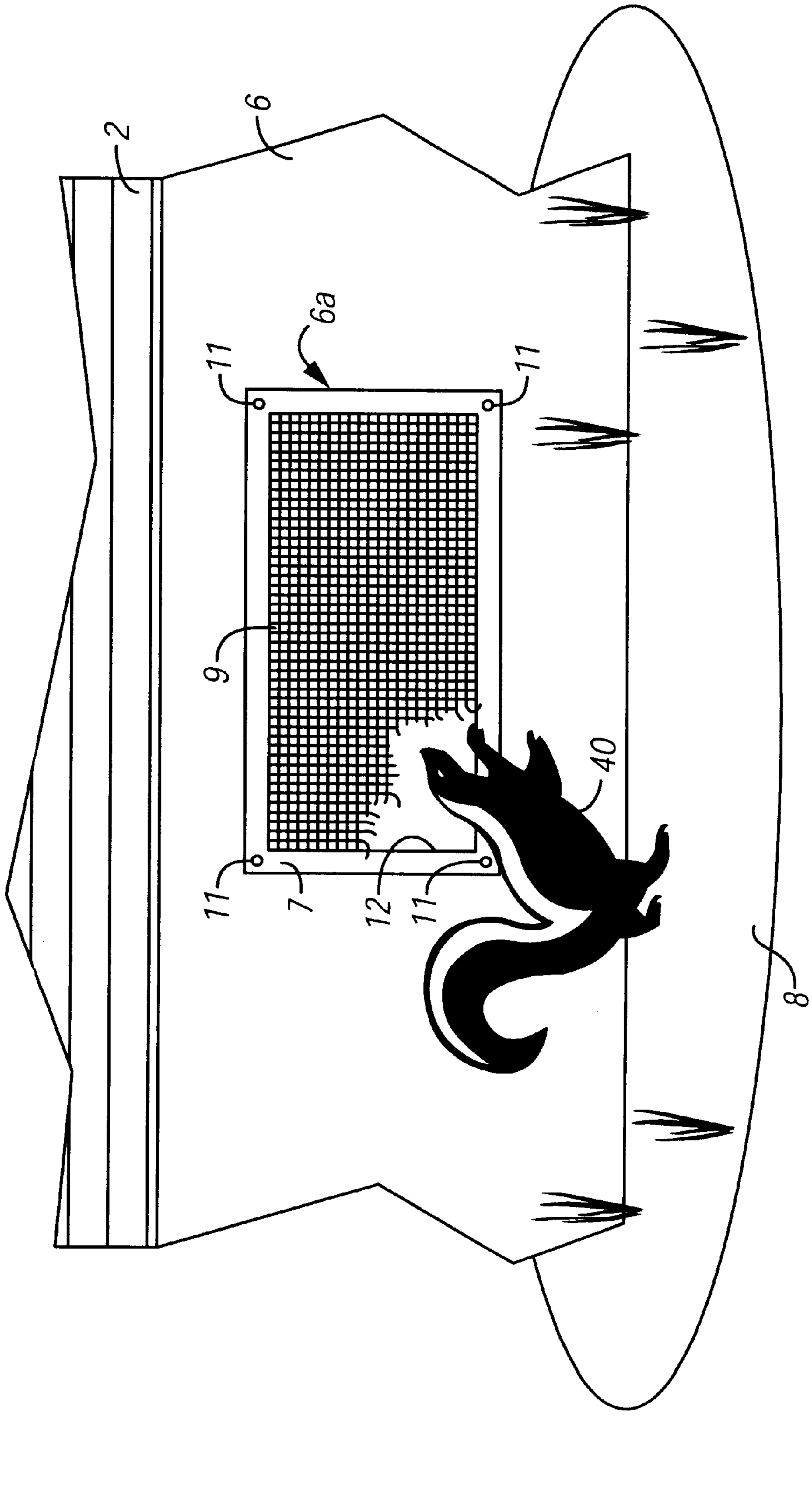
FIG. 2 is a sectional view, taken along section line 2 in FIG. 1, of the foundation siding, illustrating entry of an animal into a crawl space (not shown) beneath the structure through a tear hole in a screen mesh of one of the foundation vents.

Referring initially to FIGS. 1 and 2, an elevated structure 1 such as a home or business is elevated with respect to the ground 8. While the elevated structure 1 may have any of a variety of characteristics, the frame (not shown) of the elevated structure 1 is supported above the ground 8 typically on multiple brick or concrete footings (not shown) that are spaced around the perimeter and the central regions of the elevated structure 1, in conventional fashion. The elevated structure 1 includes walls 2 typically having windows 3 and a door or doors 4. A roof 5 is supported on the walls 2. Foundation siding 6 encloses a crawl space (not shown) defined beneath the elevated structure 1. Multiple vents **6*a* are typically provided in the foundation siding 6, in spaced-apart relationship to each other, to vent the air in the crawl space (not shown) enclosed by the foundation siding 6**.

As shown in FIG. 2, each vent **6*a* typically includes a rectangular foundation vent frame 7 that may be secured to the foundation siding 6 by means of threaded fasteners 11 or other techniques known by those skilled in the art. A screen mesh 9 covers a vent opening 10 (FIG. 4) defined by the foundation vent frame 7. Alternatively, multiple, typically three, horizontal louvers (not shown) may span the foundation vent frame 7 and close the vent opening 10. One of the problems frequently associated with prolonged use of the screen-type vents 6*a* is that a tear hole 12 forms in the screen mesh 9 due to rusting or corrosion of the screen mesh 9, or as a result of force intentionally or inadvertently applied to the screen mesh 9. In the case of the louver-type vent, one or more of the louvers may break and form a hole in the vent. Accordingly, small animals 40 such as skunks or raccoons, for example, are often capable of crawling through the tear hole 12 and entering the crawl space beneath the elevated structure 1**.

Figure 4:
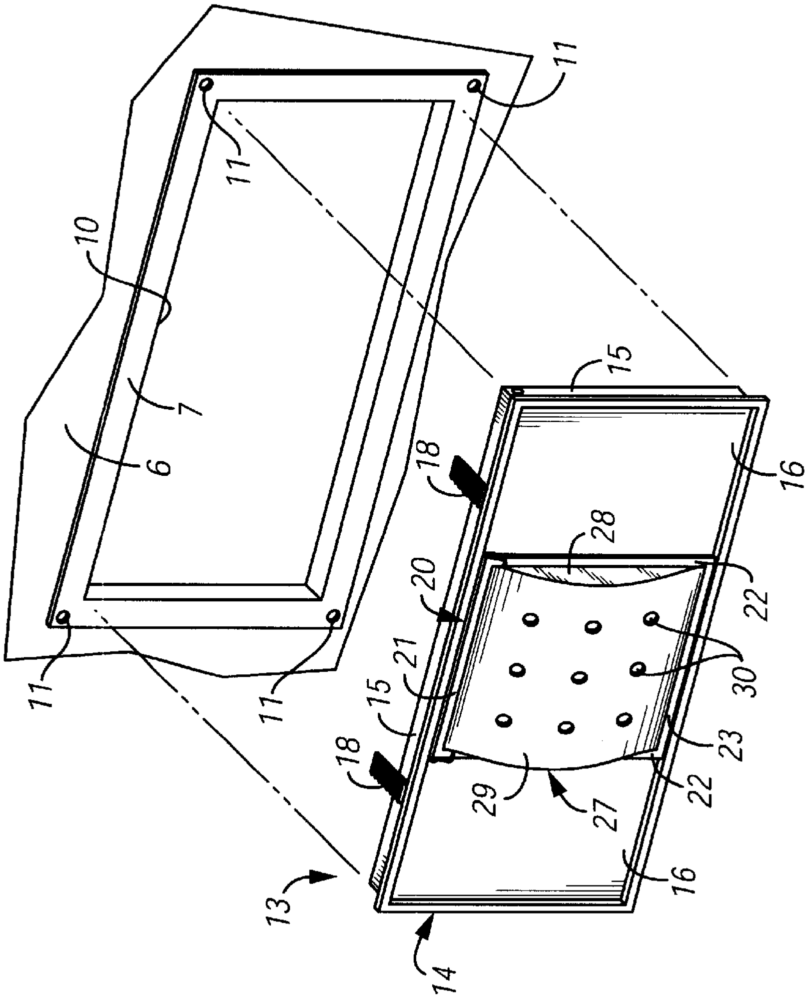
FIG. 4 is an exploded, front perspective view of an animal extraction gate of the present invention, illustrating a typical frame tab technique for mounting the gate in a vent opening.
Figure 3:
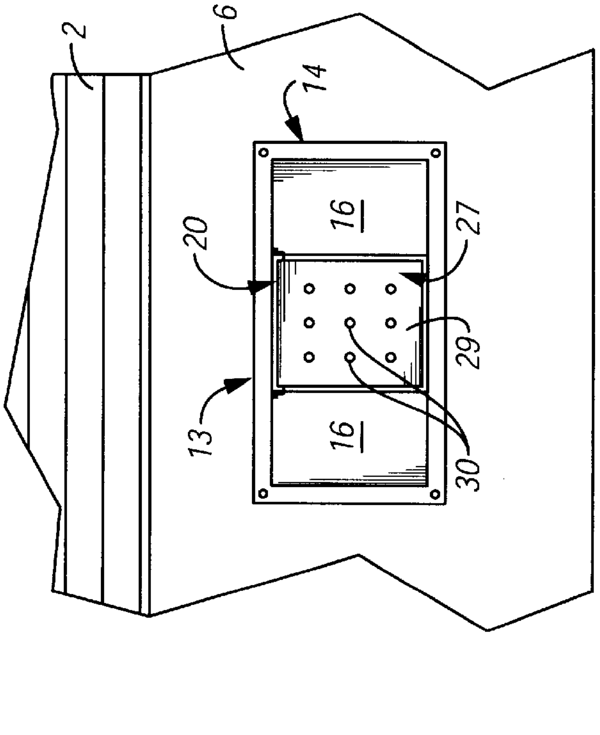
FIG. 3 is a front view of a preferred embodiment of the animal extraction gate of the present invention, mounted in one of the vent openings in the foundation siding (partially in section) of a structure.
Figure 5:
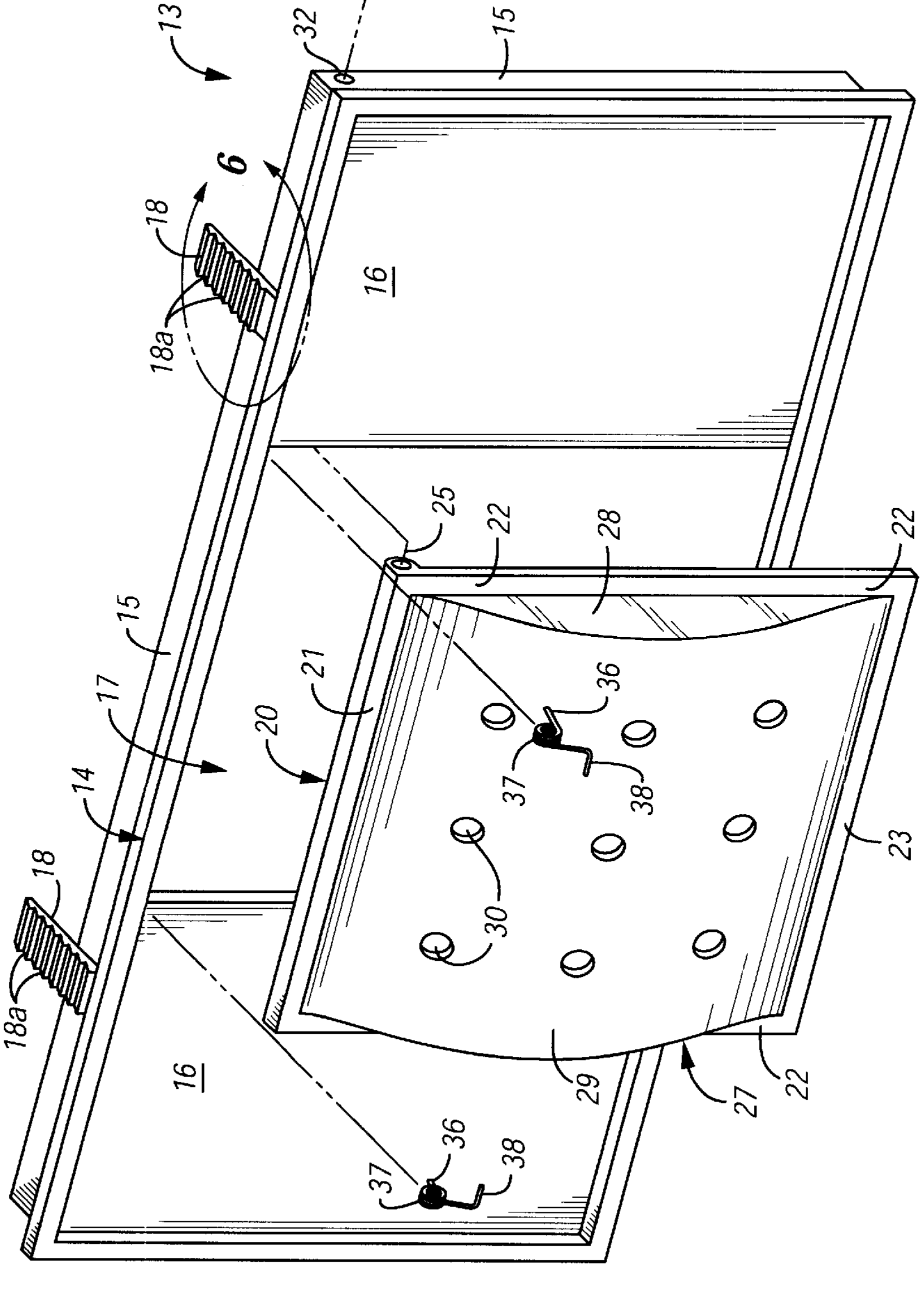
FIG. 5 is an exploded, front perspective view of an animal extraction gate of the present invention, illustrating a hinge rod technique for pivotally mounting a gate door in the gate frame element of the animal extraction gate.
Figure 6:
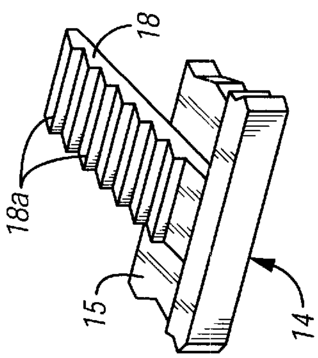
FIG. 6 is a perspective view, taken along section line 6 in FIG. 5, of a frame tab used to removably mount the animal extraction gate in a frame opening in the gate frame of the present invention.
Figure 8:
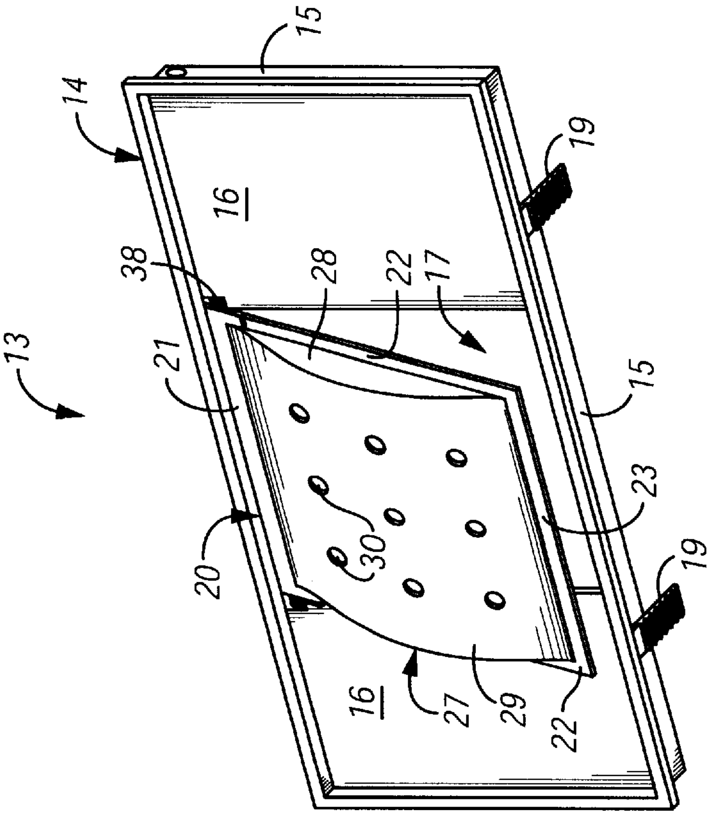
FIG. 8 is a bottom perspective view of an animal extraction gate of the present invention, with the gate door disposed in the open position.
Figure 7:
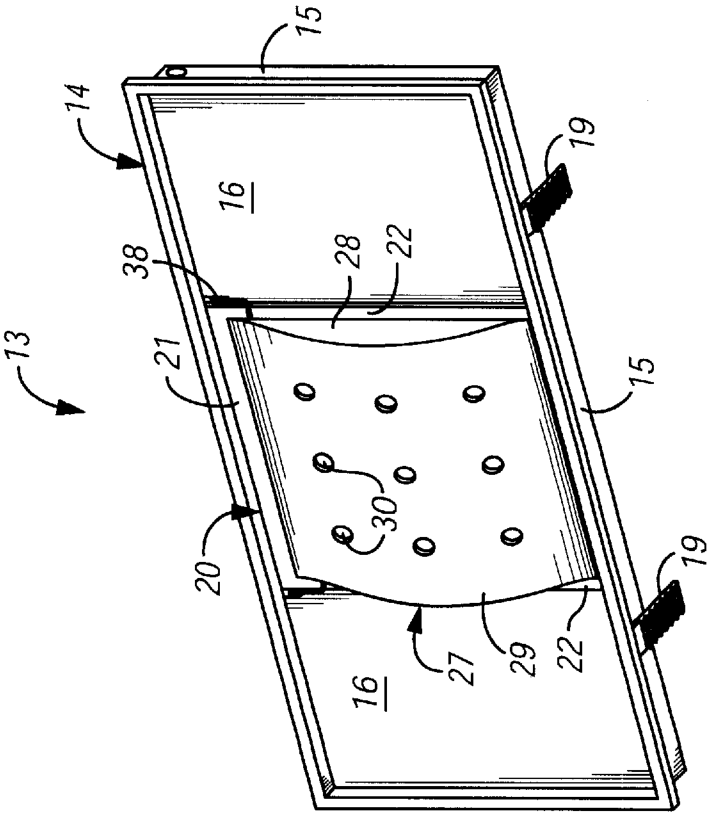
FIG. 7 is a bottom perspective view of an animal extraction gate of the present invention, with the gate door disposed in the closed position.

Referring next to FIGS. 3–8, in a preferred embodiment the animal extraction gate 13 of the present invention includes a typically elongated, rectangular gate frame 14 having a rearwardly-protruding frame lip 15. As shown in FIG. 5, each of a pair of spaced-apart frame plates 16 spans the gate frame 14, defining a frame opening 17 between the frame plates 16. A gate frame rod channel 32 extends through the frame lip 15, adjacent to the upper edge thereof, for purposes which will be hereinafter described. As further shown in FIG. 5, each of a pair of upper frame tabs 18, including multiple tab teeth 18a, extends rearwardly from the gate frame 14 and typically rests on the upper surface or edge of the frame lip 15. As shown in FIGS. 7 and 8, a pair of lower frame tabs 19, each having the same design as the respective upper frame tabs 18, extends in similar fashion from the gate frame 14, beneath the lower surface or edge of the frame lip 15. The purpose of the upper frame tabs 18 and the lower frame tabs 19 will be hereinafter described.

Referring again to FIG. 5, a gate door 27 is hingedly mounted on the gate frame 14 and reversibly closes the frame opening 17, in the manner hereinafter described. The gate door 27 includes a typically rectangular door frame 20 that includes a top frame member 21 and a bottom frame member 23, joined by side frame members 22. A door frame rod channel 25 extends through the top frame member 21 for purposes which will be hereinafter described. A side panel 28 (one of which is shown in FIG. 5) extends from each side frame member 22, and a front panel 29 spans the side panels 28 and the top frame member 21 and bottom frame member 23. In a preferred embodiment, the exterior surface of the front panel 29 has a convex shape, as shown in FIG. 5, whereas the interior surface of the front panel 29 has a concave shape. However, it is understood that the front panel 29 of the gate door 27 may have any alternative configuration consistent with the use requirements for the animal extraction gate 13. Multiple light openings 30 typically extend through the front panel 29 in a selected pattern.

As further shown in FIG. 5, an elongated door hinge rod 34 extends through the gate frame rod channel 32 in the frame lip 15 and the registering door frame rod channel 25 in the top frame member 21 of the door frame 20, to hingedly mount the door frame 20 in the frame opening 17. The door hinge rod 34 further extends through the coiled body 37 of each of a pair of springs 36, each having an L-shaped spring arm 38 extending from the coiled body 37. As shown in FIG. 7, the spring arm 38 of each spring 36 normally engages the corresponding side frame member 22 of the door frame 20 to bias the side frame members 22 against the respective frame plates 16 and maintain the frame opening 17 in a closed position to close the frame opening 17. Upon the application of outward pressure to the typically concave interior surface of the gate door 27, against the bias imparted to the gate door 27 by the springs 36, the gate door 27 disengages the frame plates 16 and exposes the frame opening 17, as shown in FIG. 8.

Referring next to FIGS. 1–4, 7 and 8, in typical application the animal extraction gate 13 of he present invention is used to remove an animal or animals 40 (FIG. 2) from a crawl space enclosed by a foundation wall or foundation siding 6 beneath an elevated structure 1 without the need for entering the crawl space or trapping or harming the animals 40. Accordingly, all but one of the vents 6*a* having a tear opening 12 in the screen mesh 9 thereof, as shown in FIG. 2, or partially or completely lacking the screen mesh 9 and which may enable each animal 40 to escape from the crawl space, is initially closed or sealed typically using cardboard (not shown), wood (not shown) or any other technique that is effective in preventing escape of the animal 40 from the crawl space through the torn or open vent or vents 6*a*. Alternatively, each of the vents 6*a* having the broken or open screen mesh 9 may be replaced with a replacement vent 6*a* having an intact screen mesh 9. In the event that each vent 6*a* is a louver-type vent (not shown), the broken louver or louvers in each vent may be removed and replaced with an intact louver or louvers. Next, the screen mesh 9 is removed from the foundation vent frame 7 of the remaining vent 6*a*. In the event that the vent 6*a* is a louver-type vent, the multiple louvers (not shown) are removed from the foundation vent frame 7 typically by applying pressure to the louvers using a flat-bladed screwdriver, for example. Next, as shown in FIG. 4, the animal extraction gate 13 of the present invention is installed in the vent opening 10 defined by the foundation vent frame 7. This is accomplished by inserting the upper frame tabs 18 and the lower frame tabs 19 (FIG. 7) into the vent opening 10 and thereby causing engagement of the tab teeth 18*a* (FIG. 6) of each upper frame tab 18 and lower frame tab 19 with the foundation vent frame 7, as the frame lip 15 of the gate frame 14 is pushed into the vent opening 10 until the rear surface of the gate frame 14 engages the foundation vent frame 7.

After all but one of the broken or open vents 6*a* have been closed, sealed or replaced and the animal extraction gate 13 has been installed in the foundation vent frame 7 of the remaining vent 6*a*, in the manner heretofore described, the animal or animals 40 in the crawl space enclosed by the foundation siding 6 are capable of escaping from the crawl space only through the animal extraction gate 13. Accordingly, as each animal 40 eventually senses the need to leave the crawl space in search for food, for example, the animal 40 uses its nose to nudge the interior surface of the foundation siding 6, including perhaps the closed, sealed or replaced and unyielding vents 6*a*, in an effort to discover an opening for escape from the crawl space. Upon encountering the gate door 27 of the animal extraction gate 13, the animal 40 senses the concave interior surface of the front panel 29 on the gate door 27, and this prompts the animal 40 to nudge or push outwardly against the gate door 27 against the bias imparted by the springs 36. Accordingly, the gate door 27 pivots to the open position on the door hinge rod 34, as shown in FIG. 8, thereby exposing the frame opening 17 and enabling escape of the animal 40 from the crawl space through the now-exposed frame opening 17. After the animal 40 completely exits the frame opening 17 and releases the gate door 27, the springs 36 again bias the gate door 27 to the closed position shown in FIG. 7. Because the side frame members 22 of the door frame 20 engage the respective frame plates 16 on the gate frame 14, pivoting of the gate door 27 into the frame opening 17 is prevented such that the animal 40 is incapable of re-entering the crawl space through the animal extraction gate 13. Furthermore, due to the closed or sealed additional vents 6*a* in the foundation siding 6, the animals 40 are incapable of re-entering the crawl space through those closed or sealed vents 6*a*. Finally, the animal extraction gate 13 can be removed from the foundation vent frame 7, as desired, by disengaging the upper frame tabs 18 and lower frame tabs 19 from the foundation vent frame 7, after which a replacement screen mesh 9 (FIG. 2) or replacement louvers (not shown) may be provided in the foundation vent frame 7 as well as in the closed or sealed vents 6*a* spaced around the foundation siding 6. While the animal extraction gate 13 heretofore described utilizes a pair of upper frame tabs 18 and a pair of lower frame tabs 19 to removably mount the gate frame 14 on the foundation vent frame 7, it is understood that the gate frame 14 may be attached to the foundation vent frame 7 using alternative methods known by those skilled in the art, including threaded fasteners (not shown), in non-exclusive particular.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

I claim:

1. An animal extraction gate for installation in a vent provided in a foundation siding, comprising:

- a gate frame having a frame opening for engaging the vent;
- a gate door carried by said gate frame, said gate door movable between a closed position and an open position in said frame opening; and
- a bias mechanism operably engaging said gate door for biasing said gate door in said closed position.

2. The animal extraction gate of claim 1 further comprising a plurality of light openings in said gate door.

3. The animal extraction gate of claim 1 wherein said gate door has a generally concave shape.

4. The animal extraction gate of claim 3 further comprising a plurality of light openings in said gate door.

5. The animal extraction gate of claim 1 further comprising a plurality of frame tabs carried by said gate frame for engaging said vent.

6. The animal extraction gate of claim 5 further comprising a plurality of light openings in said gate door.

7. The animal extraction gate of claim 5 wherein said gate door has a concave shape.

8. The animal extraction gate of claim 7 further comprising a plurality of light openings in said gate door.

9. An animal extraction gate for installation in a vent provided in a foundation siding, comprising:

- a gate frame for engaging the vent;
- a pair of frame plates provided in said gate frame;
- a frame opening defined between said pair of frame plates;
- a gate door pivotally carried by said gate frame, said gate door movable between a closed position wherein said gate door engages said pair of frame plates and closes said frame opening and an open position wherein said gate door disengages said pair of frame plates and opens said frame opening; and
- a bias mechanism operably engaging said gate door for biasing said gate door in said closed position.

10. The animal extraction gate of claim 9 further comprising a plurality of light openings in said gate door.

11. The animal extraction gate of claim 9 wherein said gate door has a generally concave shape.

12. The animal extraction gate of claim 11 further comprising a plurality of light openings in said gate door.

13. The animal extraction gate of claim 9 further comprising a plurality of frame tabs carried by said gate frame for engaging said vent.

14. The animal extraction gate of claim 13 further comprising a plurality of light openings in said gate door.

15. The animal extraction gate of claim 13 wherein said gate door has a generally concave shape.

16. The animal extraction gate of claim 15 further comprising a plurality of light openings in said gate door.

17. An animal extraction gate for installation in a vent provided in a foundation siding, comprising:

a gate frame for engaging the vent;

a pair of frame plates provided in said gate frame;

a frame opening defined between said pair of frame plates;

a gate door comprising a door frame pivotally carried by said gate frame, a pair of side panels carried by said door frame and a generally concave front panel carried by said pair of side panels and said door frame;

wherein said gate door is movable between a closed position wherein said door frame engages said pair of frame plates and closes said frame opening and an open position wherein said door frame disengages said pair of frame plates and opens said frame opening; and a bias mechanism operably engaging said gate door for biasing said gate door in said closed position.

18. The animal extraction gate of claim 17 further comprising a plurality of light openings provided in said front panel of said gate door.

19. The animal extraction gate of claim 17 further comprising a plurality of frame tabs carried by said gate frame for engaging said vent.

20. The animal extraction gate of claim 19 further comprising a plurality of light openings provided in said front panel of said gate door.

* * * * *